United States Patent
Nguyen et al.

(10) Patent No.: US 9,500,824 B2
(45) Date of Patent: Nov. 22, 2016

(54) ENHANCED EMI PROTECTION FOR A CONNECTOR SYSTEM

(71) Applicant: US Conec, Ltd., Hickory, NC (US)

(72) Inventors: Hiep Nguyen, Fort Hill, SC (US); Darrell R. Childers, Hickory, NC (US); Michael E. Hughes, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 14/880,208

(22) Filed: Oct. 10, 2015

(65) Prior Publication Data

US 2016/0103284 A1    Apr. 14, 2016

Related U.S. Application Data

(60) Provisional application No. 62/062,844, filed on Oct. 11, 2014.

(51) Int. Cl.
*G02B 6/42* (2006.01)
*G02B 6/38* (2006.01)

(52) U.S. Cl.
CPC ........... *G02B 6/4277* (2013.01); *G02B 6/3897* (2013.01); *G02B 6/4292* (2013.01)

(58) Field of Classification Search
CPC .......................... G02B 6/3897; G02B 6/4277
USPC ......................................... 385/76, 77, 78, 86
See application file for complete search history.

(56) References Cited

U.S. PATENT DOCUMENTS

| 4,795,885 A * | 1/1989 | Driggers ................. B23K 1/18 219/534 |
| 6,555,999 B1 * | 4/2003 | Lindsey ................. G01R 15/14 324/117 R |
| 2010/0202736 A1 * | 8/2010 | Roth .................... G02B 6/3823 385/59 |

* cited by examiner

*Primary Examiner* — Ryan Lepisto
(74) *Attorney, Agent, or Firm* — Michael L. Leetzow, P.A.

(57) ABSTRACT

To increase the protection of a fiber optic connector system from EMI, apertures in the system must be as small as possible. To reduce the size of apertures in the system, the openings are minimized by using electrically conductive fiber optic connector parts, including a connector housing, a fiber optic ferrule disposed within the electrically conductive connector housing, and an electrically conductive heat-shrink attachment securable to the connector housing. An electrically conductive heat shrink may be attached to the heat-shrink attachment to provide more protection.

9 Claims, 5 Drawing Sheets

ENHANCED EMI PROTECTION FOR A CONNECTOR SYSTEM

REFERENCE TO RELATED CASE

This application claims priority under 35 U.S.C. §119 (e) to provisional application No. 62/062,844 filed on Oct. 11, 2014, the contents of which are hereby incorporated by reference in their entirety.

BACKGROUND OF THE INVENTION

Field of the Invention

In systems that use multi-fiber optic connectors, EMI protection is needed, particularly as the modulation frequencies are increasing. Indeed, the modulation frequencies are increasing such that they may now exceed 25 GB/s. To protect the system from the EMI, the openings or apertures in panels in which the multi-fiber optic connectors are inserted need to have a reduced size or to be completely eliminated. Typically, the apertures can be reduced to about the size of the multi-fiber ferrules that are used in the multi-fiber optic connectors. However, even these small size openings are too large given the higher modulation frequencies.

Thus, a connector system that provides for EMI protection is needed as the modulation frequencies at which the components of a system increase.

SUMMARY OF THE INVENTION

The present invention is directed to a fiber optic connector that includes a connector housing that is electrically conductive, a fiber optic ferrule disposed within the electrically conductive connector housing, and an electrically conductive heat-shrink attachment securable at a first end to the electrically conductive connector housing to secure the fiber optic ferrule within the electrically conductive connector housing, the electrically conductive heat-shrink attachment having a hollow, rearward extending portion extending from a second end of the electrically conductive heat-shrink attachment and away from the electrically conductive connector housing, wherein the electrically conductive connector housing and electrically conductive heat-shrink attachment provide an electrical path from the electrically conductive heat-shrink attachment and the connector housing to electrical ground.

In some embodiments, a heat shrink attached to the hollow, rearward extending portion extending from a second end of the electrically conductive heat-shrink attachment and optical fibers extending rearwardly from the connector housing.

In some other embodiments, the heat shrink is electrically conductive or heat shrink is a metal braided sleeve.

In another embodiment, the fiber optic connector is physically and electrically connected to a panel that is also connected to electrical ground.

According to another aspect of the present invention, a fiber optic connector that provides EMI protection includes a connector housing that is electrically conductive, a fiber optic ferrule disposed within the electrically conductive connector housing, an electrically conductive heat-shrink attachment securable at a first end to the electrically conductive connector housing to secure the fiber optic ferrule within the electrically conductive connector housing, the electrically conductive heat-shrink attachment having a hollow, rearward extending portion extending from a second end of the electrically conductive heat-shrink attachment and away from the electrically conductive connector housing, wherein the electrically conductive connector housing and electrically conductive heat-shrink attachment provide an electrical path from the electrically conductive heat-shrink attachment and the connector housing to electrical ground, and a heat shrink attached to the hollow, rearward extending portion extending from a second end of the electrically conductive heat-shrink attachment and optical fibers extending rearwardly from the connector housing.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
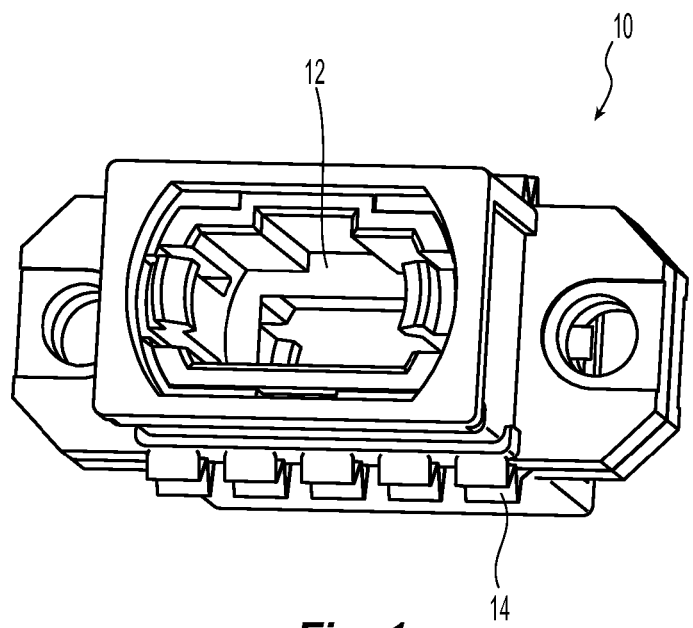
FIG. 1 is a perspective view of a first prior art adapter with metal parts that are connectable to electrical ground and provide an opening larger than the ferrule in a fiber optic connector that fits within the adapter.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a prior art version of an adapter 10 is illustrated. The adapter is described in U.S. Pat. No. 8,870,468 B2 and owned by the same assignee as the present application. The contents of that patent are incorporated by reference herein in their entirety. As discussed in more detail therein, the adapter 10 has an EMI shield 12 that separates the two sides of the adapter 10. The EMI shield 12 also has elastic members 14, which are connected with electrical ground. However, openings in the adapter are larger than the ferrules installed in the connectors that are in turn inserted into the adapter 10.

Figure 2:
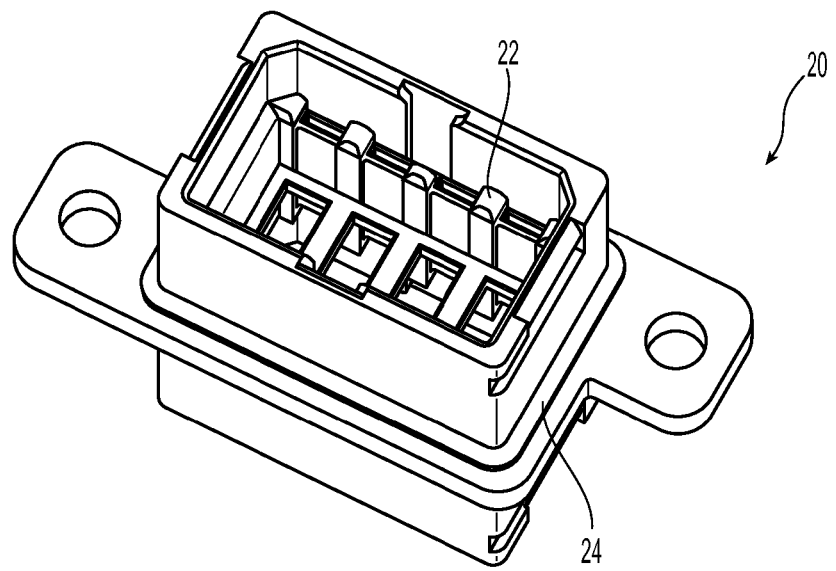
FIG. 2 is a perspective view of another adapter for a plurality of fiber optic ferrules with conductive parts that are connectable to electrical ground and provide an opening larger than the ferrule in a fiber optic connector that fits within the adapter.

A second relevant adapter 20 is illustrated in FIG. 2. That adapter is described in co-pending U.S. patent application Ser. No. 14/214,931, assigned to the same assignee, the contents of which are incorporated herein by reference. The adapter 20 is made from an electrically conductive material 22 and has openings therein are about the size of the fiber optic ferrule. The adapter 20 also has an electrically conductive gasket 24 that is in electrical communication with the panel and is also connected to electrical ground. However, there remain openings around the fiber optic ferrules in both of these adapters. Thus, it would be beneficial to have a fiber optic connector that has a long and small effective aperture to prevent the escape of energy through the fiber optic connector.

Figure 3:
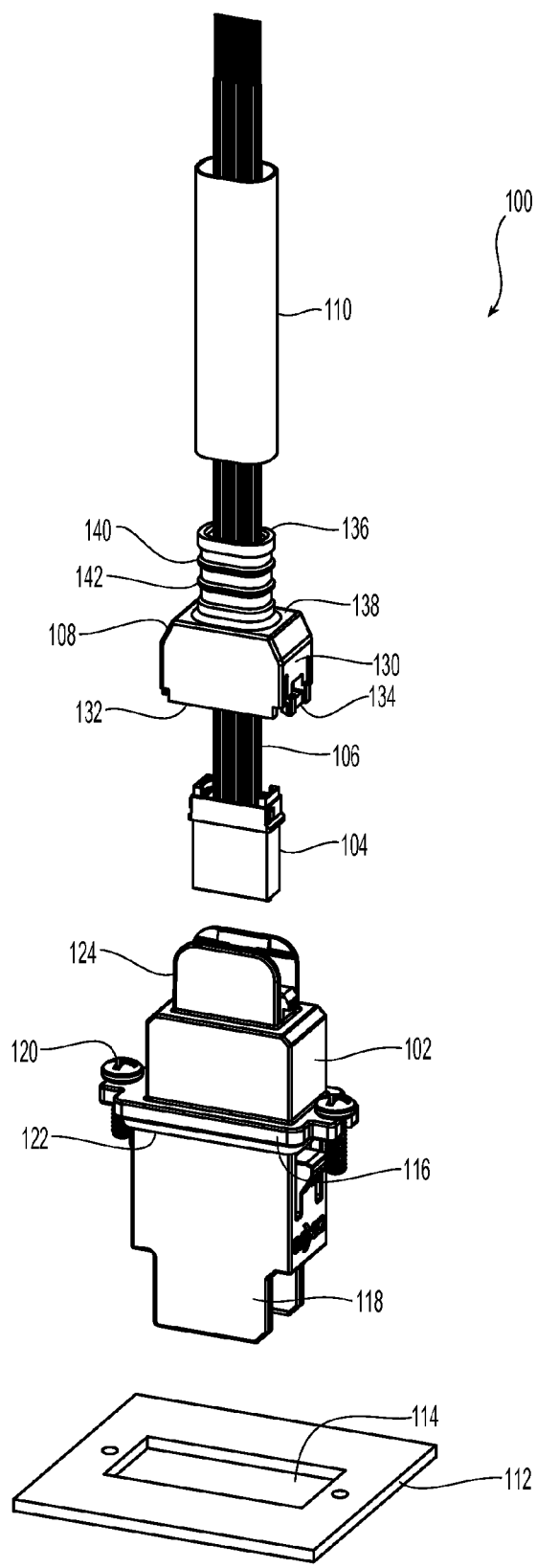
FIG. 3 an exploded perspective view of one embodiment of a fiber optic connector according to the present invention with a portion of a panel.
Figure 4:
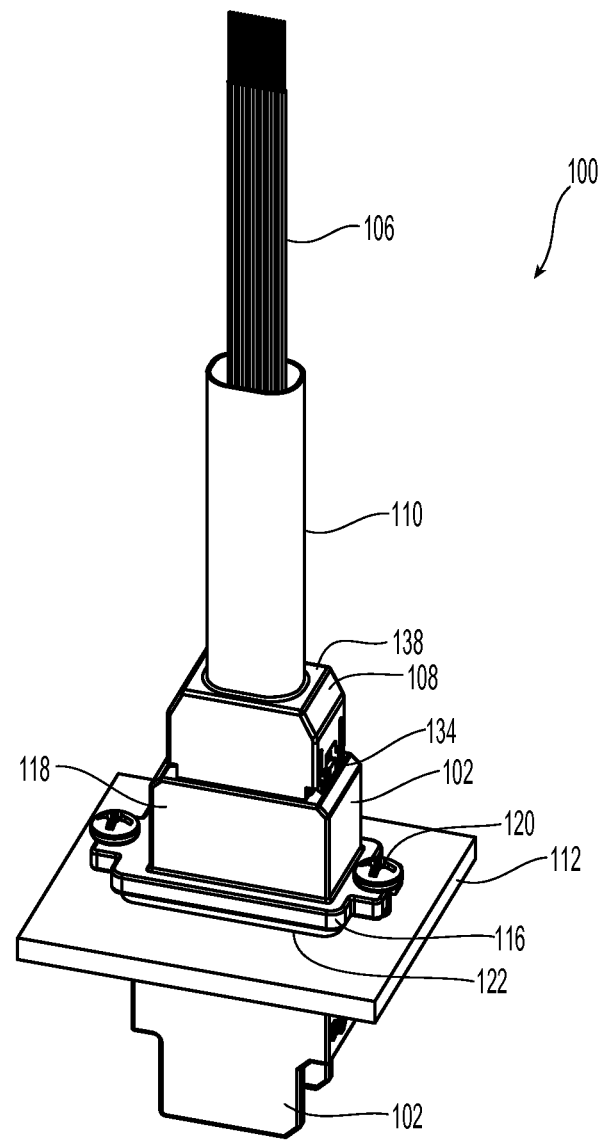
FIG. 4 is a perspective view of the fiber optic connector of FIG. 3 in an assembled state and inserted into the portion of the panel.

One embodiment of a fiber optic connector 100 according to the present invention is illustrated in FIG. 3. The fiber optic connector 100 has a connector housing 102 that is electrically conductive. Disposed within the connector housing 102 is a fiber optic ferrule 104 that is used to terminate the optical fibers 106. An electrically conductive heat-shrink attachment 108 is secured to the electrically conductive connector housing 102 to secure the fiber optic ferrule 104 within the electrically conductive connector housing 102. A heat shrink 110 may also be attached to the heat-shrink attachment 108, further providing EMI protection, as explained in more detail below. A portion of a panel 112 is illustrated in the figures to show how a fiber optic connector 100 may be utilized. It would be recognized by one of ordinary skill in the art that the panel 112 could be larger and have more openings 114 therein to accommodate more fiber optic connectors 100.

The fiber optic connector 100, as illustrated herein, has an electrically conductive connector housing 102. The connector housing 102 can be fabricated out of a conductive polymer or even a metal material. The connector housing 102, as illustrated, is configured to be not only the connector housing, but also function as an adapter by passing through the opening 114 of the panel 112. As such, the connector housing 102 has a flange 116 extending radially outward from an outside surface 118 of the connector housing 102. The flange 116 engages a surface of the panel 112, preventing the fiber-optic connector 100 from being inserted too far and passing through the panel 112. Additionally, fasteners 120 may be included to secure the connector housing 102 to the panel 112. The fasteners 120 may include any appropriate fasteners, including but not limited to, screws, rivets, bayonet-style connectors, etc. An electrically conductive gasket 122 may be provided around the outside surface 118 of the connector housing 102 to be disposed between the panel 112 and the flange 116.

Figure 5:
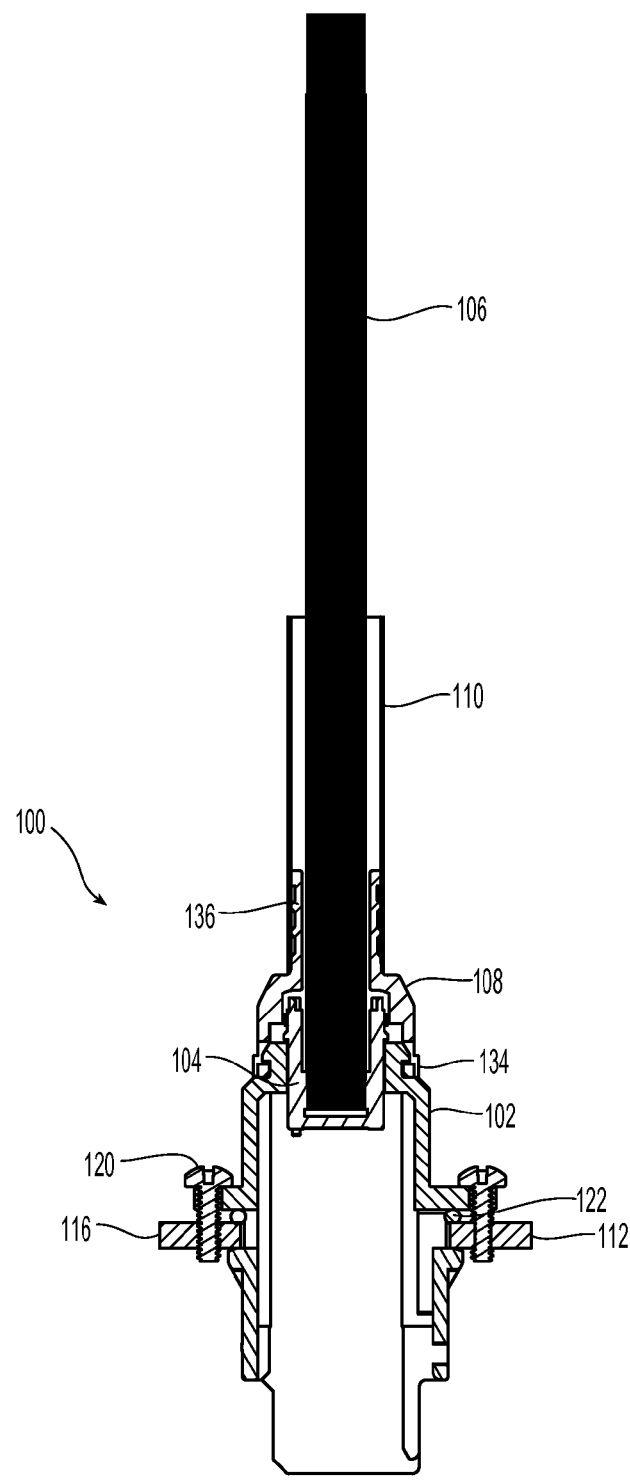
FIG. 5 is a cross section of the fiber optic connector of FIG. 3.

As illustrated, the fiber optic connector 100 completely fills the opening 114 in the panel 112. With the connector housing 102 filling the opening 114 and thereby eliminating the space around the fiber-optic ferrule 104, the only opening would be at the rearward end 124 of the connector housing 102. However, attached to the rearward end 124 of the connector housing 102 is the heat-shrink attachment 108. The heat-shrink attachment 108 secures the fiber-optic ferrule 104 within the connector housing 102. See FIG. 5. The heat-shrink attachment 108 has a main body portion 130 that attaches at a first end 132 to the rearward end 124 of the connector housing 102. While the first end 132 has latches 134 to secure heat-shrink attachment 108 to the connector housing 102, it could be attached by other methods. For example, it could be attached using an adhesive, fasteners, ultrasonic welding, etc.

The heat-shrink attachment 108 has a hollow, rearward extending portion 136 extending from a second end 138 of the main body portion 130 and away from the electrically conductive connector housing 102. The portion 136 is illustrated as having an oval cross section, but it could have any appropriate size and shape. The portion 136 has an outside surface 140 that has an uneven configuration. As illustrated, the outside surface 140 has a series of raised circumferential portions 142 to engage a heat shrink that is attached thereto. However, other configurations may be used, including, a raised spiral configuration, a plurality of raised nodules, etc.

Figure 6:
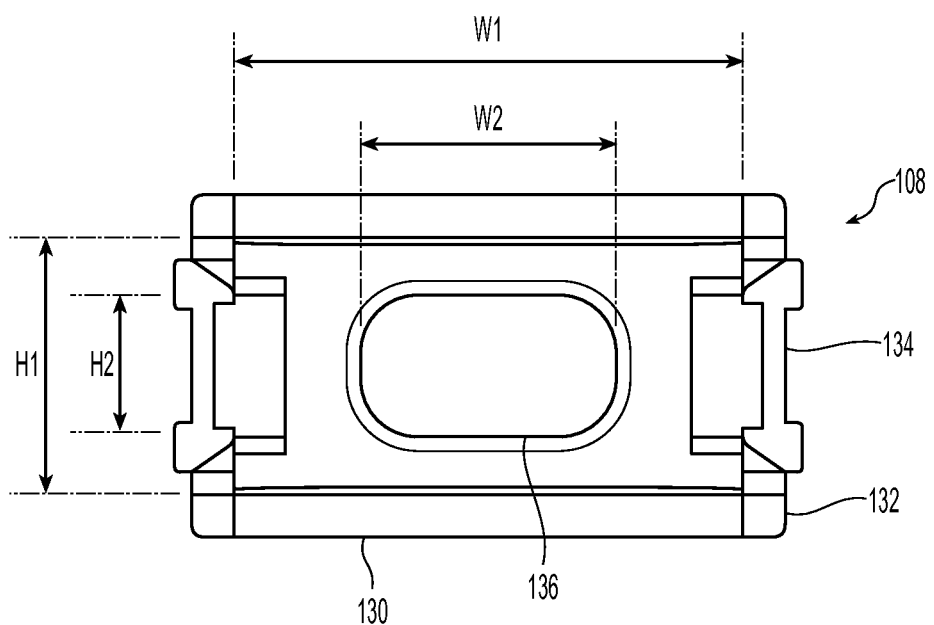
FIG. 6 is a front elevational view of the heat-shrink attachment of the fiber optic connector of FIG. 3 illustrating the cross sectional areas of the attachment.

The heat-shrink attachment 108 is similarly made from a conductive polymer or even a metal material. It should be noted that the first end 132 of the heat-shrink attachment 108 has a first cross-sectional area. Referring to FIG. 6, the first end 132 of the heat-shrink attachment 108 has a first width W1 and a first height of H1, giving an approximate area of W1*H1. Still referring to FIG. 6, the hollow, rearward extending portion 136 has a second width W2 and a second height of H2, giving an approximate area of W2*H2. As will be realized, the area of the heat-shrink attachment 108 at the first end 132 is larger than the area at the rearward extending portion 136. This configuration of the heat-shrink attachment 108 further provides EMI protection due to the electrical conductivity of the part and the smaller opening at the rearward portion 136. When the heat-shrink attachment 108 is attached to the connector housing 102, there is an electrical path from the heat-shrink attachment 108 to the connector housing 102 and to the panel 112 to electrical ground since all of panels are electrically grounded.

To provide even further EMI protection (and to also provide protection to the fiber optic connector 100), a heat shrink 110 may be connected to the heat-shrink attachment 108. When the heat shrink 110 is shrunk over the hollow, rearward extending portion 136 and the optical fibers 106, then the opening through the panel for each of the fiber optic connectors 100 is reduced to about the size of the optical fibers 106 (illustrated as a fiber optic ribbon in the figures). Thus, the present invention significantly reduces the size of the opening for each of the fiber optic connectors 100. As is known in the art, the heat shrink 110 provides stability and protection to the optical fibers 106. It should also be noted that the heat shrink 110 may be of any appropriate length to achieve the purposes at any particular installation. The longer the effective size of the fiber optic connectors 100 (including the connector housing 102, the heat-shrink attachment 108, and the heat shrink 110), the greater the EMI protection is afforded.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic connector providing EMI protection, the fiber optic connector comprising:
    a connector housing that is electrically conductive;
    a fiber optic ferrule disposed within the electrically conductive connector housing; and
    an electrically conductive heat-shrink attachment securable at a first end to the electrically conductive connector housing to secure the fiber optic ferrule within the electrically conductive connector housing, the electrically conductive heat-shrink attachment having a hollow, rearward extending portion extending from a second end of the electrically conductive heat-shrink attachment and away from the electrically conductive connector housing, wherein the electrically conductive connector housing and electrically conductive heat-shrink attachment provide an electrical path from the electrically conductive heat-shrink attachment and the connector housing to electrical ground.

2. The fiber optic connector according to claim 1, further comprising a heat shrink attached to the hollow, rearward extending portion extending from a second end of the electrically conductive heat-shrink attachment and optical fibers extending rearwardly from the connector housing.

3. The fiber optic connector according to claim 2, wherein the heat shrink is electrically conductive.

4. The fiber optic connector according to claim 2, wherein the heat shrink is a metal braided sleeve.

5. The fiber optic connector according to claim 1, wherein the fiber optic connector is physically and electrically connected to a panel that is also connected to electrical ground.

6. The fiber optic connector according to claim 1, wherein the electrically conductive heat-shrink attachment has a first end connectable to the connector housing and a second end attachable to a heat shrink, the first end having an opening with a first cross sectional area and the second end having an opening with a second cross section area, the first cross sectional area being larger than the second cross sectional area.

7. The fiber optic connector according to claim 1, wherein the fiber optic connector is configured to be inserted into an opening an electrically conductive panel.

8. The fiber optic connector according to claim 7, wherein the fiber optic connector is secured to the electrically conductive panel.

9. A fiber optic connector providing EMI protection, the fiber optic connector comprising:
    a connector housing that is electrically conductive;
    a fiber optic ferrule disposed within the electrically conductive connector housing;
    an electrically conductive heat-shrink attachment securable at a first end to the electrically conductive connector housing to secure the fiber optic ferrule within the electrically conductive connector housing, the electrically conductive heat-shrink attachment having a hollow, rearward extending portion extending from a second end of the electrically conductive heat-shrink attachment and away from the electrically conductive connector housing, wherein the electrically conductive connector housing and electrically conductive heat-shrink attachment provide an electrical path from the electrically conductive heat-shrink attachment and the connector housing to electrical ground; and
    a heat shrink attached to the hollow, rearward extending portion extending from a second end of the electrically conductive heat-shrink attachment and optical fibers extending rearwardly from the connector housing.

\* \* \* \* \*